United States Patent
Melski et al.

(10) Patent No.: US 11,586,532 B2
(45) Date of Patent: Feb. 21, 2023

(54) SOFTWARE TEST ENVIRONMENT WITH AUTOMATED CONFIGURABLE HARNESS CAPABILITIES, AND ASSOCIATED METHODS AND COMPUTER READABLE STORAGE MEDIA

(71) Applicant: GrammaTech, Inc., Ithaca, NY (US)

(72) Inventors: David Gordon Melski, Ithaca, NY (US); Eric Rizzi, Ithaca, NY (US); Vlad Folts, Ithaca, NY (US)

(73) Assignee: GRAMMATECH, INC., Ithaca, NY (US)

( * ) Notice: Subject to any disclaimer, the term of this patent is extended or adjusted under 35 U.S.C. 154(b) by 49 days.

(21) Appl. No.: 17/366,779

(22) Filed: Jul. 2, 2021

(65) Prior Publication Data
US 2023/0004483 A1  Jan. 5, 2023

(51) Int. Cl.
*G06F 11/36* (2006.01)
*G06F 21/57* (2013.01)

(52) U.S. Cl.
CPC ...... *G06F 11/3684* (2013.01); *G06F 11/3688* (2013.01); *G06F 21/57* (2013.01)

(58) Field of Classification Search
None
See application file for complete search history.

(56) References Cited

U.S. PATENT DOCUMENTS

| | | | |
|---|---|---|---|
| 2013/0212435 A1* | 8/2013 | Qiu | G06F 11/263 714/E11.178 |
| 2018/0225189 A1* | 8/2018 | Putra | G06F 11/3072 |
| 2021/0397543 A1* | 12/2021 | Wu | G06F 11/3688 |

FOREIGN PATENT DOCUMENTS

CN    110825618 A  *  2/2020

OTHER PUBLICATIONS

Godefroid, "Automated Whitebox Fuzz Testing", 2008, Microsoft (Year: 2008).*
Mozilla Wiki—Security/Fuzzing/Peach, electronically retrieved Jun. 14, 2021, 6 pages. https://wiki.mozilla.org/Security/Fuzzing/Peach.
RR, electronically retrieved Jun. 14, 2021, 3 pages. https://rr-project.org/.
GitHub—rr-debugger/rr, electronically retrieved Jun. 14, 2021, 1 page. https://github.com/rr-debugger/rr.
TwistLock—Writing a Fuzzer, electronically retrieved Jun. 14, 2021, 27 pages. https://1stdirectory.co.uk/_assets/files_comp/b78864b0-4894-4e61-b615-0f4d2b0f08f7.pdf.
AFL—American Fuzzy Loop, electronically retrieved Jun. 14, 2021, 19 pages. https://afl-1.readthedocs.io/en/latest/index.html.

(Continued)

*Primary Examiner* — Hossain M Morshed
(74) *Attorney, Agent, or Firm* — Nixon & Vanderhye PC

(57) ABSTRACT

Certain example embodiments relate to software test with automated configurable harness capabilities. Certain example embodiments automatically generate harnesses and properly encoded seed inputs by recording the input operations of a system under test (SUT), identifying the processes to be fuzz tested, generating seed inputs and a manifest describing the SUT's input vectors, and generating the harness to effectively feed derived (and potentially "malformed") input to the SUT. The techniques described herein may be used to test a computer system, e.g., to probe for potential vulnerabilities.

25 Claims, 4 Drawing Sheets

(56) References Cited

OTHER PUBLICATIONS

More About AFL, electronically retrieved Jun. 14, 2021, 19 pages. https://afl-1.readthedocs.io/en/latest/about_afl.html.

Wikipedia—Fuzzing, electronically retrieved Jun. 14, 2021, 3 pages. https://en.wikipedia.org/wiki/Fuzzing.

Sean Gallagher "Microsoft Launches 'Fuzzing as a Service' to Help Developers Find Security Bugs", ARS Technica, Sep. 27, 2016, 2 pages. https://arstechnica.com/information-technology/2016/09/microsoft-launches-fuzzing-as-a-service-to-help-developers-find-security-bugs/.

Patrice Godefroid et al., "Automated Whitebox Fuzz Testing," electronically retrieved Jun. 14, 2021, 16 pages. https://www.microsoft.com/en-us/research/wp-content/uploads/2016/09/ndss2008.pdf.

Microsoft—Debugging Using WinDbg Preview, electronically retrieved Jun. 14, 2021, 5 pages. https://docs.microsoft.com/en-us/windows-hardware/drivers/debugger/debugging-using-windbg-preview.

Microsoft—Exploratory and Manual Testing Scenarios and Capabilities, Sep. 26, 2019, 4 pages. https://docs.microsoft.com/en-us/azure/devops/test/overview?view=azure-devops.

Microsoft—What is Azure DevOps, Jan. 22, 2021, 2 pages. https://docs.microsoft.com/en-us/azure/devops/user-guide/what-is-azure-devops?view=azure-devops.

Caca Labs, electronically retrieved Jun. 24, 2021, 1 page. http://caca.zoy.org/wiki/zzuf.

GitHub—dex4er/fakechroot, electronically retrieved Jun. 24, 2021, 2 pages. https://github.com/dex4er/fakechroot.

PRoot, electronically retrieved Jun. 24, 2021, 5 pages. https://proot-me.github.io/.

Microsoft—Detours, Jan. 16, 2002, 1 page. https://www.microsoft.com/en-us/research/projects/detours/.

Shellphish—The Cyber Grand Challenge, electronically retrieved Jul. 1, 2021, 2 pages. https://shellphish.net/cgc.

GrammaTech News—GrammaTech's Team Techx Places Second in DARPA's Cyber Grand Challenge, Aug. 5, 2016, 2 pages. https://news.grammatech.com/grammatech-team-techx-places-second-in-darpa-cyber-grand-challenge.

GrammaTech—Techx/Xandra, electronically retrieved Jul. 1, 2021, 2 pages. http://www.grammatech.com/cyber-grand-challenge.

CGC Cyber Grand Challenge—World's First All-Machine Hacking Tournament, electronically retrieved Jul. 1, 2021, 8 pages. https://archive.darpa.mil/cybergrandchallenge/assets/pdf/cgc-brochure.pdf.

* cited by examiner

SOFTWARE TEST ENVIRONMENT WITH AUTOMATED CONFIGURABLE HARNESS CAPABILITIES, AND ASSOCIATED METHODS AND COMPUTER READABLE STORAGE MEDIA

TECHNICAL FIELD

Certain example embodiments described herein relate to computer software testing techniques. More particularly, certain example embodiments relate to using an automated, configurable harness to fuzz test computer software, and associated systems and/or methods, e.g., for improving computer security.

BACKGROUND AND SUMMARY

Computer security continues to be an area of interest, especially in today's increasingly connected environment and as more and more "mission critical" activities are implemented with computing systems and applications running on such computing systems.

Fuzz testing, or fuzzing, is a dynamic application security testing technique. Fuzzing aims to detect a broad array of vulnerabilities, including known and unknown, or zero-day, vulnerabilities. Fuzz testing tools, also sometimes referred to as fuzzers, in general work by sending many inputs to a target, often referred to as the System Under Test (SUT). Fuzzing seeks to trigger "bad behaviors," such as crashes, infinite loops, memory leaks, and/or the like. These anomalous behaviors may be a sign of an underlying vulnerability. Fuzzing has been used in software development efforts such as Operational Flight Plans (OFPs) and C4ISR (Command, Control, Communications, Computers, Intelligence, Surveillance and Reconnaissance) software to minimize the defects during development and to maximize the cyber security of the resulting applications.

A "harness" may be generated and subsequently used to consistently configure a fuzzing tool. As will be appreciated by those skilled in the art, a harness may be thought of as being uniquely-developed software that enables the fuzzer to send inputs to the SUT. A harness thus mediates between the fuzzing tool and the SUT, so that the tool can fuzz the SUT and in essence "look for" vulnerabilities.

As one example, American Fuzzy Lop (AFL) is a security-oriented fuzzer that employs a type of compile-time instrumentation and genetic algorithms to automatically discover clean, interesting test cases that trigger new internal states in the targeted SUT. AFL repeatedly submits a "blob" of bytes representing the input to a SUT. With AFL and other "blob fuzzers," the harness starts the SUT, demultiplexes the blob into component inputs, and supplies them to the SUT "on demand." The harness resets the application state after each run so that the SUT can be fuzzed repeatedly.

Fuzzers often generate a single blob of bytes, treating every SUT in the same, simplistic manner. Unfortunately, however, not all SUTs are the same. In this regard, there typically is a great deal of variety in the amount and types of input a system may require. Different SUTs may have multiple input channels (including file, network, registry key, command line, and/or other inputs), and these different input channels may be blocking (where input/output operations cannot continue until the function is complete) or non-blocking (where input/output operations can continue before the function is complete). Given differences in the amounts and types of input, it is technically challenging to come up with a "one-size-fits-all" blob fuzzer solution.

Currently, writing a harness may require complicated scripting technology and reverse engineering of a SUT. Indeed, development of customized harnesses to fuzz applications is a complex and challenging effort, typically requiring extensive knowledge about the application, software development skills for generating the harness code, and an understanding of the capabilities of the fuzzing tool. Generating a harness thus typically is a time-consuming, knowledge-intensive, and difficult process, at least because a great deal of expertise generally is needed in developing the harness, and extensive research typically is required when it comes to understanding the inputs required by the SUT.

Thus, it will be appreciated that it would be desirable to address the above-described and/or other issues. For instance, it will be appreciated that it would be desirable to improve existing fuzzing techniques by providing test systems and associated techniques that implement an automated approach for discovering an application's functions, extracting information usable for testing, more easily generating harnesses for SUTs, and executing fuzz testing techniques based on the same.

Certain example embodiments help address these and/or other issues. For instance, one aspect of certain example embodiments relates to techniques that simplify the configuration of fuzzing tools and other input-generation tools (such as, for example, AFL) and symbolic execution engines. In this regard, certain example embodiments perform operations for recording relevant information from one or more executions of a SUT, formatting the recorded information into a manifest for use by a fuzzing tool on a SUT, configuring a software-independent (or "generic") harness using the manifest so that the harness can take inputs generated by the fuzzer and feed them to the SUT, and processing the recorded information to generate "seed inputs" that can be used by the harness and can be used by the fuzzer as starting points for deriving additional inputs.

The approach of certain example embodiments advantageously enables more effective configuration of a fuzzer in significantly less time compared to conventional approaches. Additionally, the approach of certain example embodiments advantageously enables a tester to access the majority of the required content for a harness by simply running the SUT, which requires substantially less expertise and effort than the current approaches for writing a harness. One aspect of certain example embodiments thus relates to the automated construction of a harness that the fuzzer uses to launch and feed input to a SUT.

The techniques disclosed herein may work with commercially-available and/or custom-developed record and replay technologies (such as, for example, Mozilla's Record and Replay Framework) and the expertise/experience of the developer to improve the effective use of fuzzing tools in a wide variety of different applications in a wide variety of different domains. For instance, the techniques of record and replay computer technology tools may be used and expanded upon to improve the functionality of the overall testing approach.

Thus, another aspect of certain example embodiments relates to the automated capture of data and assembly of seed inputs that fuzzers use as starting points for deriving additional inputs (e.g., via mutation of the seeds). This aspect advantageously helps simplify the encoding of useful test inputs for a SUT that are usable with the harness, which provides a technical improvement even when users already have useful test inputs for the SUT. For example, it is a technical improvement to be able to gather "real" inputs, assemble them, and then fuzz based on them, e.g., while also taking into account the channels over which they are used. By contrast, some current techniques require users to manually encode inputs, which can be a challenging process, even if the seed inputs are known.

The techniques described herein advantageously improve fuzzing tools used in application security testing and can provide stronger cyber security in a much shorter timeframe (compared to conventional tools), with higher confidence that defects, deficiencies, and related vulnerabilities have been addressed.

Another aspect of certain example embodiments makes it possible to use existing single-stream analyzers to test more complicated, and more realistic, applications in more sophisticated ways. Many existing dynamic analyzers are limited to modifying or analyzing a single input channel. This unfortunately is not realistic for a variety of applications, including even some command-line LINUX applications. Certain example embodiments therefore do not just generate a single, undifferentiated blob to be "thrown" at the SUT. Instead, certain example embodiments demultiplex inputs and provide them over correct input channels (e.g., via input redirection).

In certain example embodiments, a method of testing a system under test (SUT) is provided. Interactions with the SUT are recorded. Inputs from the recorded interactions are extracted. A manifest is generated from the extracted inputs, with the manifest including (a) a list of inputs to the SUT to be replaced in connection with fuzzing of the SUT, and (b) input channels for entries in the list of inputs to the SUT. The manifest is generatable to indicate whether the respective entries in the list of inputs to the SUT are fixed or non-fixed and blocking or non-blocking. The extracted inputs are encoded into one or more archives, the encoding including inserting delimiters into the one or more archives based on the generated manifest, the extracted inputs being encoded in the one or more archives in an order specified by the manifest. The SUT is fuzzed using a generic harness configured for the SUT based on the generated manifest, with the fuzzing of the SUT mutating the one or more archives to feed derived (and potentially "malformed") inputs to the SUT over the input channels specified in the generated manifest in connection with the testing.

According to certain example embodiments, interactions may be user interactions performed during user execution of the SUT and/or replays of a script.

According to certain example embodiments, interactions may be recorded across multiple runs of the SUT, e.g., with the manifest potentially being generated from a filtered set of the interactions recorded across the multiple runs of the SUT.

According to certain example embodiments, processes relevant to testing of the SUT may be identified from the recorded interactions and/or inputs to the SUT to be replaced may be identified, e.g., using a heuristic.

According to certain example embodiments, a plurality of archives may be encoded, e.g., with the archives being structured as blobs. For instance, the blobs may be broken down into reference files, and the fuzzing may comprise redirecting the SUT to the reference files based on the manifest. In some instances, the fuzzing may comprise demultiplexing contents of the blobs based on the manifest and feeding the demultiplexed contents to the SUT over input channels specified in the manifest.

According to certain example embodiments, valid input channels specifiable in the manifest may include files, network connections, command-line arguments, environment variables, and/or the like.

According to certain example embodiments, the manifest may be provided in a structured file format such as, for example, XML, JSON, and/or the like.

According to certain example embodiments, the order may provide non-fixed socket inputs, then non-fixed file inputs, and then bytes used to select multiple choice inputs.

According to certain example embodiments, different types of delimiters may be encoded, e.g., with a first delimiter type separating input components, a second delimiter type separating connections in the input for a given input channel, and a third delimiter type separating chunks in a non-blocking input.

In certain example embodiments, a method of testing a system under test (SUT) is provided. Interactions with the SUT are recorded. Inputs from the recorded interactions are extracted. A manifest is generated from the extracted inputs, with the manifest including (a) a list of inputs to the SUT to be replaced in connection with fuzzing of the SUT, and (b) input channels for entries in the list of inputs to the SUT. The manifest is generatable to indicate whether the respective entries in the list of inputs to the SUT are fixed or non-fixed and blocking or non-blocking. The extracted inputs are encoded into one or more archives, the encoding including inserting delimiters into the one or more archives based on the generated manifest. Different types of delimiters are encoded, including a first delimiter type separating input components, a second delimiter type separating connections in the input for a given input channel, and a third delimiter type separating chunks in a non-blocking input. The SUT is fuzzed using a harness, with the fuzzing of the SUT mutating the one or more archives to feed derived (and potentially "malformed") inputs to the SUT over the input channels specified in the generated manifest in connection with the testing.

According to certain example embodiments, the harness may be a pre-provided test harness for the SUT.

According to certain example embodiments, the harness may be a runtime configured by the manifest and usable with a plurality of different SUTs based on different provided manifests.

In certain example embodiments, there is provided a non-transitory computer readable storage medium including instructions that, when executed by a hardware processor of a test framework, are configured to perform operations corresponding to the methods set forth in the instant applications. Programs, runtimes, and other sets of instructions in and of themselves are also provided in certain example embodiments. In a similar fashion, certain example embodiments provide test frameworks and/or other computer-based systems for performing the functionality disclosed herein.

With regard to the latter, for instance, in certain example embodiments, a test framework for testing a SUT is provided. The frame work includes a recorder configured to record interactions with the SUT, and at least one processor operably coupled to a memory. The at least one processor being configured to perform operations comprising: extracting inputs from the recorded interactions; generating a manifest from the extracted inputs, the manifest including (a) a list of inputs to the SUT to be replaced in connection with fuzzing of the SUT, and (b) input channels for entries in the list of inputs to the SUT, wherein the manifest is generatable to indicate whether the respective entries in the list of inputs to the SUT are fixed or non-fixed and blocking or non-blocking; encoding the extracted inputs into one or more archives, the encoding including inserting delimiters into the one or more archives based on the generated manifest, wherein different types of delimiters are encoded, a first delimiter type separating input components, a second delimiter type separating connections in the input for a given input channel, and a third delimiter type separating chunks in a non-blocking input; and fuzzing the SUT using a harness, the fuzzing of the SUT mutating the one or more archives to feed derived inputs to the SUT over the input channels specified in the generated manifest in connection with the testing.

These aspects, features, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Certain example embodiments provide a generic harnessing technology usable in connection with an application running on an operating system. More particularly, certain example embodiments relate to using an automated, configurable harness to fuzz test computer software, and associated systems and/or methods. The techniques described herein may be used to test a computer system, e.g., to probe for potential vulnerabilities.

The harnessing technology of certain example embodiments is "generic" in the sense that it is independent of the fuzzer being used and is applicable to a wide variety of different SUTs, which may use different input channels and/or different input types. The harness technology may be configured using a curated manifest, and the manifest in turn may be built based on input gathered by recording different executions of the SUT.

Certain example embodiments automatically generate harnesses and properly encoded seed input by recording the input operations of a SUT, identifying the processes to be fuzz tested, generating seed inputs and a manifest describing the SUT's input vectors, and configuring the harness to effectively feed derived (and potentially "malformed") input to the SUT. Differently conceived, certain example embodiments generate a configuration (a manifest) for a generic harness (the Bindle runtime). The harnessing technology of certain example embodiments is used in connection with a test environment which includes, in addition to the SUT, four notional components, namely, a recorder, a manifest, a runtime, and a launcher. These latter four components comprise the test architecture. The test architecture interfaces with the SUT, but the SUT is not a part of the test environment per se. For ease of reference, the test architecture is sometimes referred to herein as Bindle. It will be appreciated that these components are notional in the sense that they perform computer-executable operations, with the operations being organizable in different potential code snippets, functions, libraries, application programming interfaces (APIs), and/or the like. Thus, although these four example components are sometimes discussed below, it will appreciated that the specific operations may be performed by the same or different bundles of executable program logic (e.g., the launcher and runtime may be provided in a common executable that interfaces with a separate executable or integrated functionality for recording and replaying input and output relevant to the SUT). It will be appreciated that certain example embodiments also interface with a dynamic analysis tool, such as a fuzzer, which may or may not be included in the test architecture in different example implementations.

Example End-to-End View of the Techniques of Certain Example Embodiments

Figure 1:
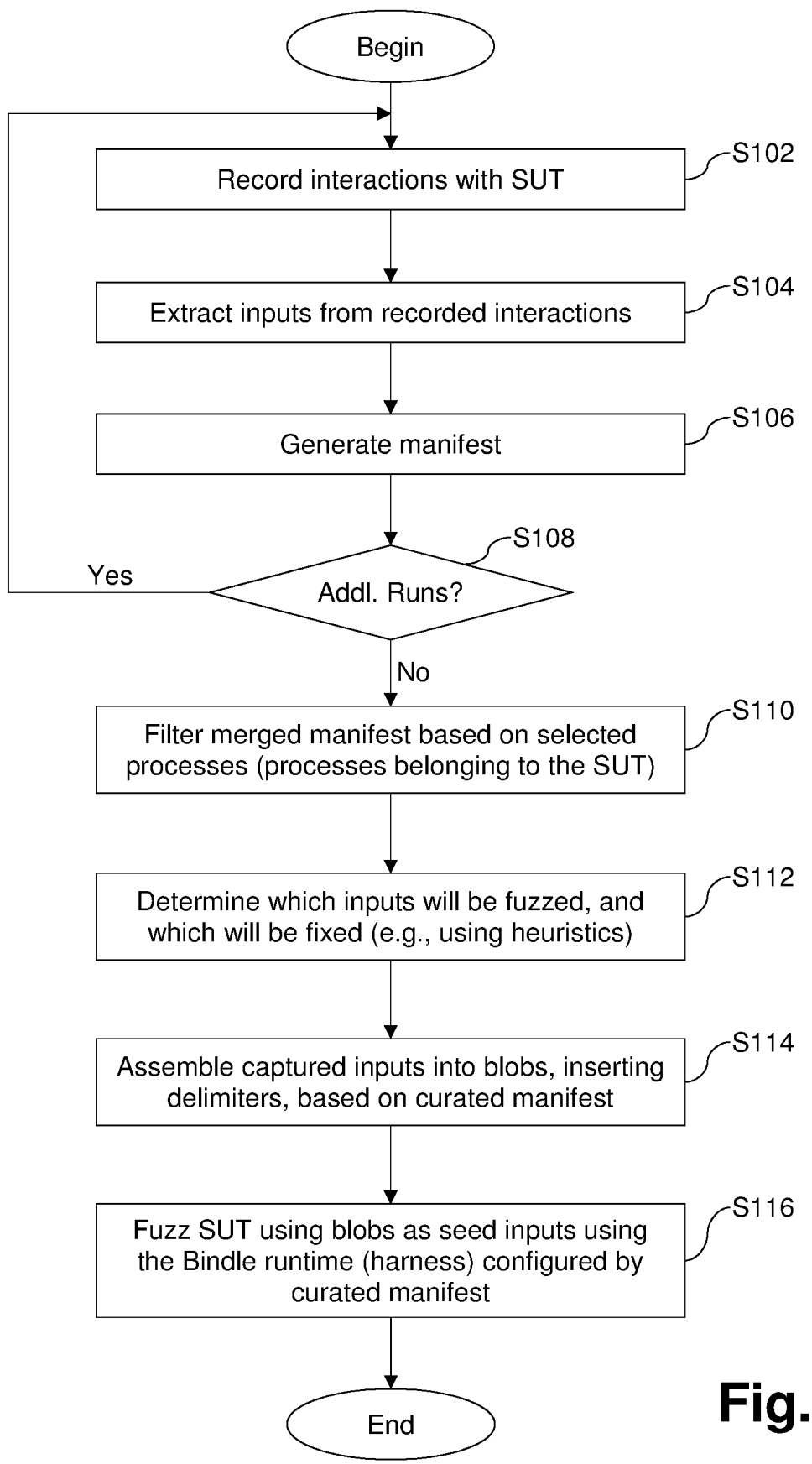
FIG. 1 is a flowchart showing an example approach for fuzzing an application, in accordance with certain example embodiments.
Figure 2:
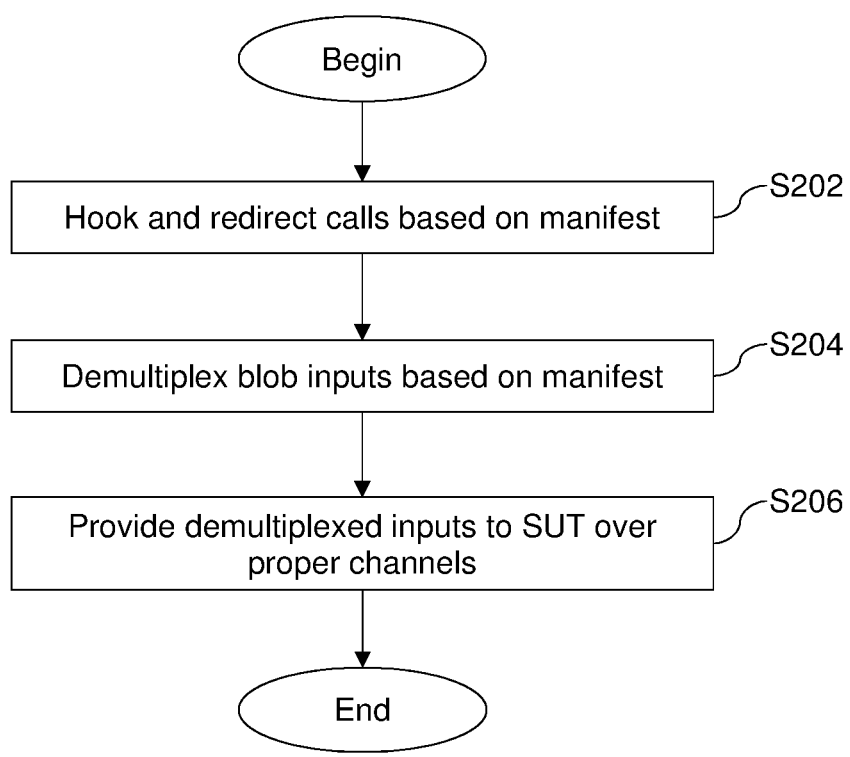
FIG. 2 is a flowchart showing further details as to how an application can be fuzzed, in accordance with certain example embodiments.
Figure 3:
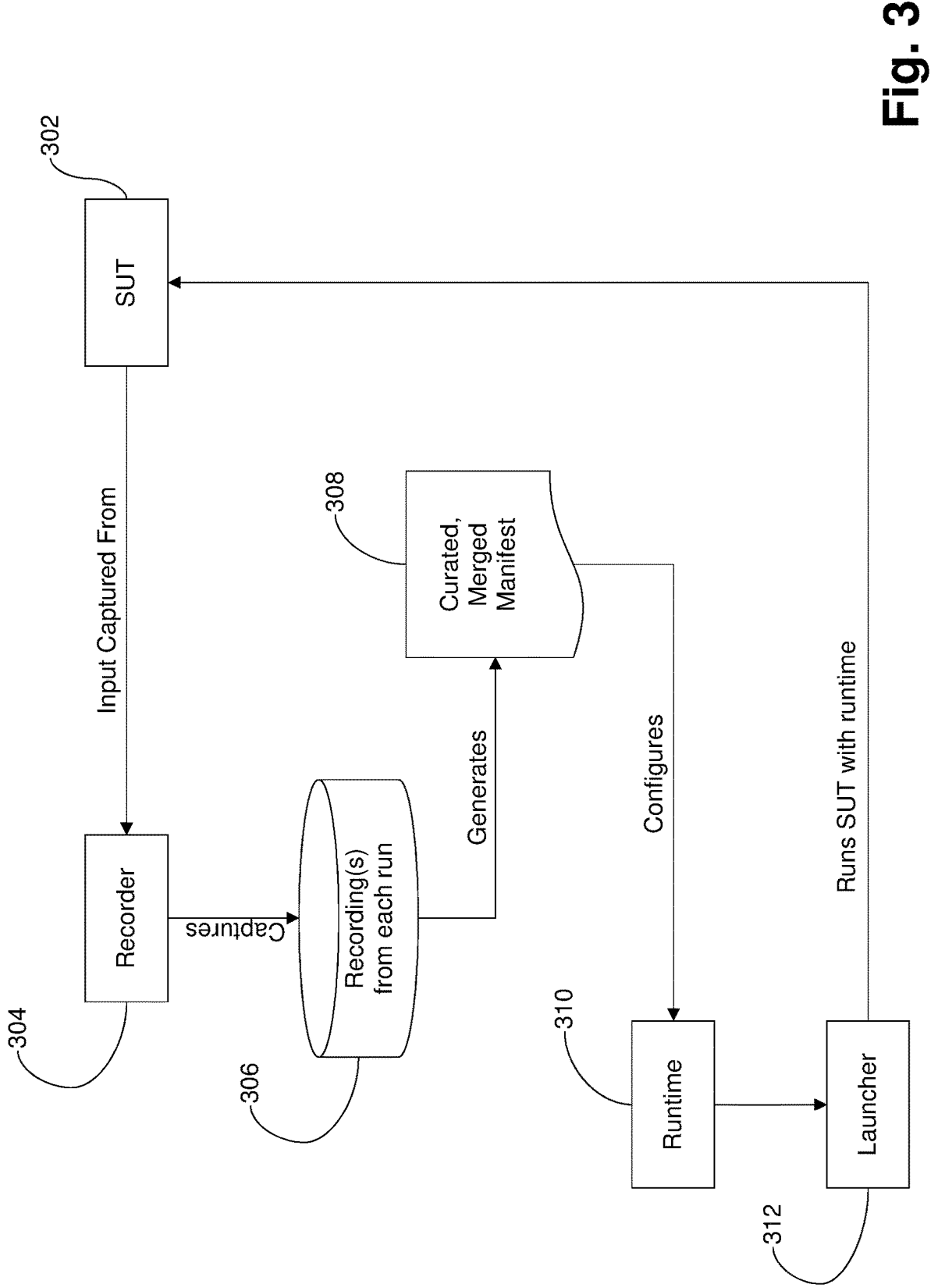
FIG. 3 is a block diagram showing components of a system incorporating generic harness technology in accordance with certain example embodiments.
Figure 4:
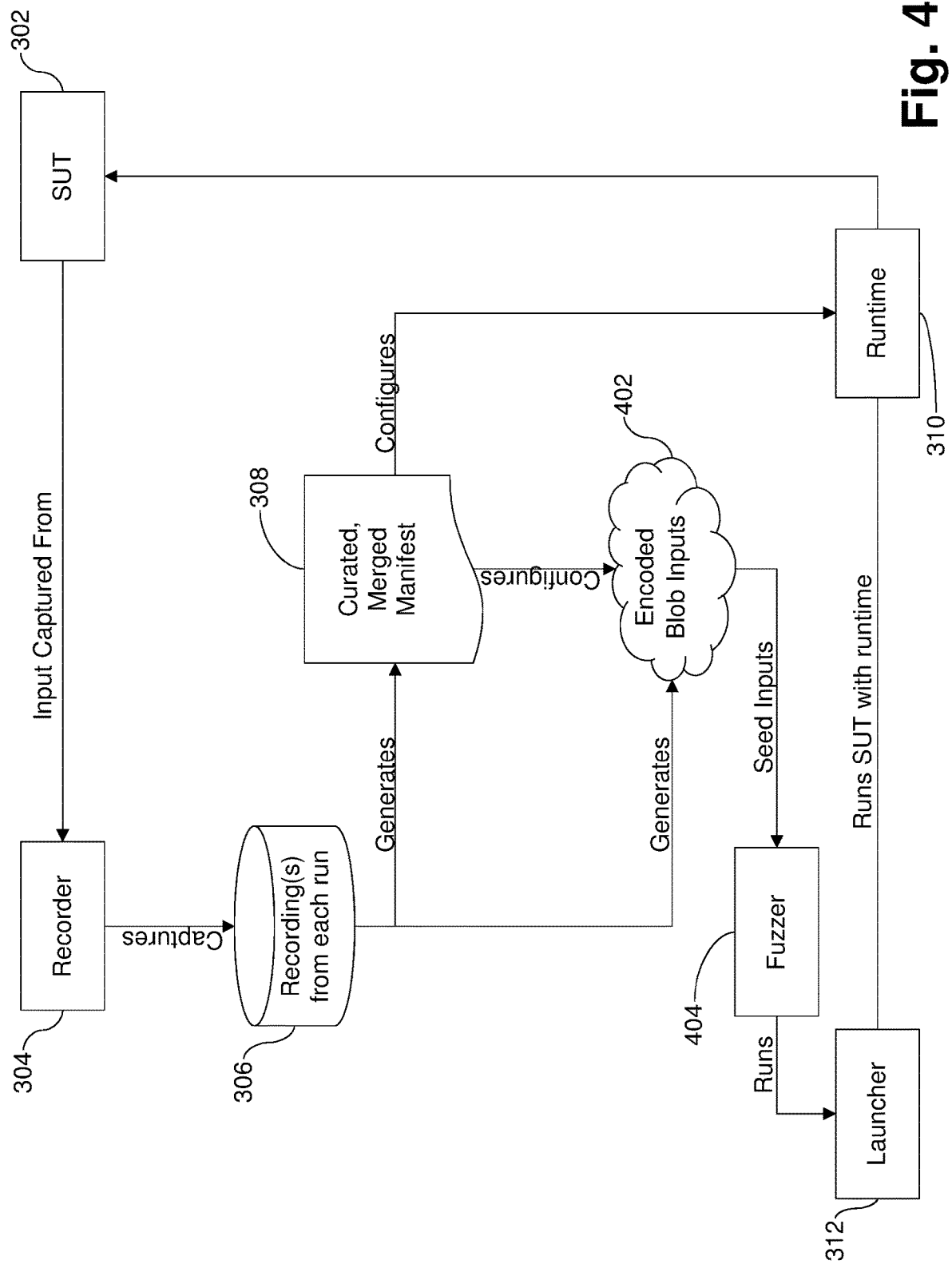
FIG. 4 is a block diagram showing a different notional view compatible with the FIG. 3 block diagram, in accordance with certain example embodiments.

An example end-to-end view of the techniques of certain example embodiments will now be provided in connection with the FIG. 1-2 flowcharts, and the FIG. 3-4 block diagrams.

FIG. 1 is a flowchart showing an example approach for fuzzing an application, in accordance with certain example embodiments, and FIG. 2 in essence provides further details regarding the last step in the FIG. 1 flowchart. FIG. 3 is a block diagram showing components of a system incorporating generic harness technology in accordance with certain example embodiments; and FIG. 4 is a block diagram showing a different notional view compatible with the FIG. 3 block diagram, in accordance with certain example embodiments.

As shown in FIG. 1, interactions with the SUT 302 are recorded in step S102, and inputs from the recorded interactions are extracted in step S104. The recording and extraction of inputs from the SUT 302 is accomplished using a recorder 304. This information may be stored in a volatile or non-volatile storage medium, such as a database or the like. As shown in FIGS. 3-4, for example, recordings from each run are stored to a data store 306. The recordings for each run are stored as a collection or linked information or a run-specific manifest. That is, a manifest with information specific to a given run is generated in step S106. If there are additional runs of the SUT 302 as determined in step S108, then the process returns to step S102, where further interactions are recorded, inputs are extracted, and run-specific manifests are generated.

If there are no more runs, then the run specific manifests are merged, and in step S110 the merged manifest is filtered based on selected processes. For example, the recorded information may record information belonging to a number of different processes, but only some of which may be relevant to the SUT 302. Operations associated with other applications on running on the SUT 302 may be filtered out. Input/Output (I/O) operations performed on or in connection with the SUT 302 may be selected for inclusion. Background or operating system operations may or may not be relevant. A user may be asked to confirm whether a particular function or the like should be included.

Certain example embodiments thus involve an identification of the processes to be fuzz test. The identification may be straightforward for a single app with a single process, but that is not realistic for many SUTs. In certain example embodiments, process identification may be facilitated by recording all inputs and processes taking place, producing a list of processes, and asking for user input to identify processes that belong to the application being tested. A process tree with multiple processes may be generated, and the selection of multiple different processes may be made from the process tree. In order to build a process tree, existing tools that trace process creation, such as strace, can be used. In addition, or in the alternative, certain example embodiments may implement a more manual approach to tree generation. For instance, certain example embodiments may involve hooking process creation and termination events and building a tree "from scratch" or supplementing the tree built by an existing tool. In certain example embodiments, it may be necessary or desirable to define boundaries of the SUT, with or without reference to a constructed process tree. This may be useful for cloud application, microservice architectures, and/or the like, where the boundaries of the app and/or the SUT as a whole may not be clearly defined. Heuristics may be employed to aid in process identification. For instance, certain example embodiments may employ a heuristic that considers executables from a particular part of the filesystem most likely to be the SUT. Another example heuristic is that certain interpreters and test frameworks are unlikely to belong to the SUT.

Based on automatic and/or user selections, as indicated in step S112, determinations may be made as to which inputs are to be fuzzed, and which will be fixed. Heuristics may include, for example, detecting whether an input (such as a file) has different contents on different runs (and if so, determining that it should be fuzzed), detecting whether an input is retrieved from a system directory (and if so, determining that it should be fixed, etc.).

The operations in step S110 generates a curated, merged manifest 308. The merged manifest 308 describes input vectors of the SUT 302. There is thus a single manifest that in essence describes the union of all inputs consumed over all runs. Merging the results of multiple distinct runs results in a more complete description of the input space of the SUT. It specifies the input types, which may include, for example, files, ports, command lines, and environment variables. It also specifies how these input vectors should be treated. That is, the manifest specifies whether each input vector is to be fuzzed by a fuzzer, replaced with constant contents, used "as is," etc. Further details regarding the configuration files usable by certain example embodiments are provided below. The merging thus is a union operation. As a concrete example, different runs may read from different input sources. For example, a first run might read file A whereas a second run might read file B, and the merged manifest should contain A and B, as they are both possibilities. Curation determines which inputs should be fuzzed. For example, it is possible that a config file should be held constant, and a curation procedure could identify such configuration files.

The merged manifest 308, with the operations in step S112 performed on the recordings from the store 306, create encoded blob inputs 402, which are feedable to the blob fuzzer 404. As indicated in step S114, the assembled captured inputs are assembled into blobs, with delimiters being inserted therein, based on the manifest. The merged manifest 308 helps configure, and the recordings from the store 306 help generate, the encoded blob inputs 402. A blob of input can be broken down into reference files, and the SUT 302 may be redirected to these reference files, e.g., as specified in the manifest 308, upon operation of the runtime 310 acting as the harness. Details regarding how the blob is encoded, including how the delimiters are used, are provided below.

The SUT 302 is fuzzed using the blobs as seed inputs using the Bindle runtime 310, which is configured by the merged manifest 308. The Bindle runtime 310 thus functions as a harness for the SUT 302.

One way to think of this is shown in FIG. 3. As shown in FIG. 3, the runtime 310 is the harness, and a launcher 312 or other utility helps run the SUT 302 with the harness in place. Another way to think of this is shown in FIG. 4. As shown in FIG. 4, the fuzzer 404 runs the launcher 312 or other utility, which helps run the SUT 302 with the runtime 310 as the harness. In certain example embodiments, fuzzer settings may be automatically suggested, e.g., to improve efficiency of fuzzing. Some example settings that may be suggested include: do not use a fork-server optimization, place the fork-server optimization at a particular point in the execution of the SUT, disable certain forms of non-determinism, and/or the like.

To run the SUT with the configured harness, calls are hooked and redirected based on the merged manifest 308, as shown in step S202. The blob inputs are demultiplexed based on the manifest in step S204, and the demultiplexed inputs are provided to the SUT 302 over the proper channels in step S206. One or more input channels may be used for a given SUT. Example input channels include one or more files, network connections, command-line arguments, environment variables, and/or the like. The runtime 310 thus is at least in part configured by the merged manifest 308. The runtime 310 demultiplexes inputs and feeds them to the SUT 302, e.g., using the LD_PRELOAD library or the like. As is known, LD_PRELOAD is an environment variable that can be used to preempt a function call, such that specified code is run before (and instead of) the called function. It is similar to fakechroot and proot in these respects. fakechroot runs a command in an environment where there is an additional possibility to use the chroot command without root privileges. proot is a user-space implementation of chroot, mount --bind, and binfmt_misc, making it possible for users to perform tasks without privileges and potentially functioning as a generic Linux process instrumentation engine. Steps S202-206 may be implemented via the Bindle runtime 310 in certain example embodiments.

By using the manifest approach, certain example embodiments provide a technical advantage in the sense that they convert the challenge of writing a harness into the much more simplistic task of writing an input manifest (which can use a simple JSON schema or the like). Certain example embodiments also simplify the technical problem of encoding a seed input to that of concatenating the contents of the component inputs. It can still be cumbersome to identify the input channels used by a SUT and/or to extract component inputs from a test suite. However, certain example embodiments automatically generate harnesses and properly encoded seed inputs by recording the input operations of a SUT when run manually or with an existing test framework. From the recording, it is possible to automatically generate the manifest and an archive (or "blob") containing the inputs accessed during the run. Certain example embodiments can use the manifest to provide harnessing capabilities for the SUT, and each archive can be used as a seed input that a fuzzer can start mutating in connection with fuzzing the SUT.

Further details regarding the enumerated notional components are provided, below.

Example Recorder

It is possible to reverse-engineer a SUT to discover valid inputs. Doing so can help find good seed inputs that can be formatted for use with a harness. This more manual approach can be technically difficult. The inventors have had an insight, however, that users can run the SUT without necessarily knowing the details of how the SUT behaves. For instance, users may be provided with, or develop, a test suite and test scripts. Testing scripts already "know" how to run the SUT and provide inputs (e.g., of the correct type and/or over the correct input channels). Thus, certain example embodiments record system behaviors as a user runs the SUT, either manually or with the aid of a test script.

As outlined above, and as described in detail below, a Bindle manifest can be created based on the observed input consumption. It also becomes possible to generate seed inputs based on the inputs used during the recording. This approach is technically advantageous because it can help avoid the need to reverse-engineer the SUT and to specially code the harness.

Certain example embodiments may adapt a commercial recording technology such as, for example, Mozilla's Record and Replay technology ("RR"), and integrate it with the Bindle harnessing technology. RR supports recording, replaying, and debugging execution of applications on Linux. The recordings are sufficiently precise to support "reverse execution" in gdb, a currently-popular debugger on Linux. More particularly, certain example embodiments adapt the record phase of RR to generate manifests and blobs (or other "archive" formats) containing the inputs accessed during the application's run for use with Bindle and AFL, as described herein.

In certain example embodiments, the recording functionality may be specifically designed to work with Windows applications. For example, recording may watch for registry accessions, mouse events, etc. Microsoft Azure DevOps and Azure Test Plans, as well as Microsoft's WinDbg Preview may be adapted so as to record executions and replay the executions to generate additional new inputs.

Example Bindle Runtime Component

The Bindle runtime component is a library, binary, or other interface that helps feed inputs to the SUT. It provides an approach to the "harnessing" problem of fuzzing multi-input programs. In certain example embodiments, the Bindle runtime provides replacements for many of common library functions for performing input and, in some cases, for performing output. Common library functions that can be replaced include, for example, read( ), fread( ), recvmsg( ), and recv( ) on Linux, and ReadFile on Windows. The Bindle runtime versions of these functions redirect the input requests from the SUT to read other inputs, e.g., from the fuzzer. Redirection may be accomplished by hooking and redirecting calls, e.g., using an LD_PRELOAD library or the like, as noted above. Although this mechanism may be performed on Linux, different approaches may be used in connection with Windows. For example, DLL hooking may be performed using the DETOURS technique. Detours can be used to intercept Win32 functions by re-writing the in-memory code for target functions.

Bindle's runtime component interprets manifests that describe the set of inputs that a SUT consumes. Given a manifest for a SUT and a "blob" of input, the Bindle runtime demultiplexes the blob into component files, command-line arguments, environment variables, Transmission Control Protocol/Internet Protocol (TCP/IP) streams, and/or the like, and feeds them to the SUT. The techniques of certain example embodiments can harness a broad range of applications for fuzzing by AFL or similar fuzzers.

There are two primary inputs to the Bindle runtime component, namely, an environment variable and a "blob." The first input, the environment variable (e.g., BINDLE_DIR), specifies a "bundle" directory for use by bindle. The Bindle runtime component both reads and writes to the bundle directory specified by this environment variable. The Bindle runtime component reads a description of the inputs that it should replace (e.g., as specified in greater detail below). The description may be stored in a file stored in any appropriate structured or unstructured format. The structured form may be, for example, in a JSON, XML, or other defined format. For instance, in certain example embodiments, the description is provided in a JSON-formatted manifest, $BINDLE_DIR/manifest.json. The Bindle runtime component will create (and potentially overwrite) files in the bundle directory for each input that it pulls from the blob (e.g., as specified below), as specified by the manifest. Input contents generally will be pulled from a blob. However, they additionally or alternatively may be supplied from files in the bundle (e.g., for inputs that are replaced with the same, fixed contents on each run). It will be appreciated that the application may overwrite the contents of these files (e.g., additional runs are completed, as temp files are updated, input is changed, etc.).

The second input, the "blob" includes the contents for the input channels that are designed for fuzzing. In certain example embodiments, the contents for each input is appended with a delimiter of a predetermined size and/or format, and then concatenated. This delimiter structure is specified by a file or other input interface. For instance, in certain example embodiments, the contents for each input is appended with the 4-byte contents of a file "delimiters/input_delim.bin" and then concatenated. The ordering of inputs in the blob is interpreted according to the manifest. In certain example embodiments, network connections precede files. By default, the Bindle runtime will read the blob from a defined input stream having a predefined maximum size. For instance, in certain example embodiments, the Bindle runtime will read the blob from stdin by default. The input stream can be overridden by specifying the blob location in the environment variable BINDLE_BLOB, e.g., so that other input streams (such as, for example, other files, network locations, and/or the like) can be considered.

The concatenation approach advantageously can work with symbolic execution engines, as well.

Some features may be implemented to assist analyzers in certain example embodiments. For instance, in an example embodiment designed to support AFL, a fork server will be set up by default. When a fork server is enabled, the fuzzed application is initialized only once. In Linux, for example, the fuzzed application will go through execve( ), linking, and libc initialization only once, and then is cloned from a stopped process image by leveraging copy-on-write. As is known, in Linux, execve( ) causes the execution of an application at a defined path, libc refers to the standard C library, and copy-on-write helps delay or altogether prevent the copying of data, e.g., so that the copying of each page in the address space is delayed until it is actually written to. The fork server communicates with the fuzzer via pipes or other input/output format and is forked for every run so that all referenced owned by a parent are duplicated and the copy is given to the child, e.g., using copy-on-write or the like.

If an environment variable (e.g., BINDLE_NO_FORKSRV) is correspondingly set, the Bindle runtime component will not attempt to set up a fork server. The fork server also will not be created if AFL or the other implemented fuzzer is not present. An environment variable (e.g., AFL_DUMB_FORKSRV) can be set to force AFL to use a fork server in dumb mode, where instrumentation data is not expected.

Example Bindle Launcher Component

The Bindle launcher component is a utility that helps simplify running programs using the Bindle runtime component, e.g., by setting the appropriate environment variables. In certain example embodiments, it expects the BINDLE_HOME variable to be set, which specifies the location of the Bindle runtime component and other information. For example, in the directory of an example configuration, the following command line can be run:

$BINDLE_HOME/bin/bindle-run -b in/hello-empty -d bundle/ \--diff/tmp/f1/tmp/f2

This will run diff/tmp/f1/tmp/f2 using the Bindle runtime component, with the bindle directory set to bundle (as a result of the -d switch) and the blob set to the file in/hello-empty (as a result of the -b switch). The manifest in this example (which is provided in bundle) specifies that the blob should be interpreted as the contents for two files, namely, /tmp/f1 and /tmp/f2. Those paths correspond to the paths given to "diff", such that when diff goes to access them, it will be redirected to instead use files that the Bindle runtime component created in the bundle directory using the contents of the blob supplied at runtime.

Example Bindle Configuration Files

As noted above, the configuration files may be provided in a structured format such as XML or JSON in certain example embodiments. For instance, the following is example manifest.json file:

```
{
  "cwd": "/home/user1",
  "sockets":[
      {"port": 10000, "ref": "6.ref" },
      {"port": 10001, "ref": "9.ref" } ],
  "files":[
      {"path": "/dev/stdin", "ref": "0.ref" },
      {"path": "/proc/self/cmdline", "ref": "cmdline.ref" },
      {"path": "/tmp/f1", "ref": "4.ref" }
  ]
}
```

Based on the above, it will be appreciated that the manifest comprises two primary arrays, sockets and files, which specify replacements for network and disk inputs. The cwd field (change working directory command) is used in certain example embodiments to interpret the paths of the files it replaces. If a decision is reached by the Bindle runtime that a relative path does not match one it should replace, the path is not modified before the file is opened. If cwd is not specified, it is given another value (e.g., /tmp/harness), which causes replacements to be obtained from this default location. The cwd command is prepended to all relative paths, even those that are passed through to the standard library. Thus, the Bindle runtime can ensure that suitable replacement files are being considered.

The "sockets" array specifies replacements for connections that can occur on ports. Consider, for example, the following line from the example manifest above:

{"port": 10000, "ref": "6.ref" }

This object from a sockets array specifies that one or more connections to port 10000 will be replaced by the contents of the file6.ref in the bundle directory, which are extracted from the blob. That is, in the course of parsing the blob, the Bindle runtime will create and fill a file6.ref in the bundle directory for the contents used to feed connection input on port 10000. This file serves several purposes, including debugging and having something to open to create a file descriptor FD when a connection is opened. The actual contents for reads from the connection may be copied directly out of a copy of the blob that is resident in memory.

A sequence of connections on a port can be encoded using the connection delimiter (see delimiters/conn_delim.bin, discussed below) to separate the contents for each connection.

As alluded to above, the files array specifies replacements for files. Consider, for example, the following line from the example manifest above:

{"path": "/tmp/f1", "ref": "4.ref" }

This example object specifies that if the subject program tries to open the file with the path/tmp/f1, it should instead get the contents of the file4.ref in the bundle directory, with the contents being extracted from the blob.

Input descriptions may be modified by additional fields in certain example embodiments. For example, the is_blocking field is a Boolean field that specifies whether or not the input should be modelled as a blocking input. As is known, blocking I/O operations ensure that control does not return to the application until the particular I/O operation is complete. Non-blocking inputs are modelled using the pkt_delim.bin delimiter to separate parts of input. If not present, the input is assumed to be blocking (is_blocking=true). As another example, the is_fixed field is a Boolean field indicating that the input contents should be taken from the reference(s) in the bundle directory, not from the blob. It is assumed to be false for single-reference inputs and true for multiple-choice inputs, e.g., as discussed below.

An input description may specify an array of reference file names In this case, the input is assumed to be fixed. That is, the fuzzer will not manipulate or vary the input flagged as being fixed. An input with more than one reference input is called a "multiple choice" input. After all socket inputs and then all file inputs have been read from the blob, an amount of data (e.g., as unsigned 8-bit integer type or uint8_t) is read from the blob for each multiple choice input to select which of the reference inputs to use to replace the specified application input.

For example, to specify a non-blocking, fixed input to replace stdin, the following may be used:

```
{
  "path": "/dev/stdin",
  "ref": "stdin.ref", "is_blocking": false, "is_fixed": true
}
```

To specify a set of fixed command lines, one of which is selected based on a byte value in the blob, the following may be used:

```
{
  "path": "/proc/self/cmdline",
  "ref": ["cmd1.ref", "cmd2.ref", "cmd3.ref" ]
}
```

The components of the blob are provided in a predetermined order. For example, the following order is used in certain example embodiments:

1. All non-fixed socket inputs, in the order specified in the sockets field.
2. All non-fixed file inputs, in the order specified in the files field.
3. Bytes used to select multiple choice inputs, applied in the order of the multiple-choice socket inputs followed by the multiple-choice file inputs (each in the order they appear in their sections of the manifest). If a ref array has only a single option, it is assumed to be fixed, but it is not "multiple choice" and no byte is consumed from the blob to choose the one and only option provided.

To help separate these components, different types of delimiters are used. First, the delimiters/input_delim.bin delimiter separates input components in a blob. Second, the delimiters/conn_delim.bin delimiter separates connections in the input for a port. Third, the delimiters/pkt_delim.bin delimiter separates available input chunks in a sequence of non-blocking read operations.

Although certain delimiter sizes and formats are described, it will be appreciated that other sizes and/or formats may be used in different example embodiments. For instance, 4-byte, 8-byte, or other sized delimiters may be used.

Blobs are created by putting tokens or delimiters between pieces. These delimiters can be used to in several ways including, for example, to separate input channels. Some channels may be blocking and others may be non-blocking (e.g., where input comes in a piece at a time and the system holds until all of the chunks are available). Delimiters can be used to feed data in piecewise to see how the SUT behaves when things come in at different times, in different sizes, in different orders, etc. Thus, certain example embodiments parsing blobs may read in as much as is told to read, or until a special delimiter is encountered. The third type of delimiter relates to connection types, delineating between adjacent connections. The blob thus can be broken into chunks based on input delimiters, then broken based on connection delimiters, and then if there's a non-blocking input further broken down again. Thus, it advantageously becomes possible to test more complicated, and more realistic, applications in more sophisticated ways. It thus also will be appreciated that blobs are generated for replay and also mutations may be generated before the SUT is run so that they too can be played, e.g., with mutations being generated between runs.

Advantageously, the techniques of certain example embodiments can support fuzzing in connection with a variety of different SUTs or a variety of different types, where different inputs are provided over different channels. This reusability is a technical advantage, as is the simplified approach to harness generation. Compared to prior approaches, rather than having to specially code a client and/or server to "talk to" a SUT, it is far simpler to merely list a network connection. In a similar vein, compared to prior approaches, rather than having to perform code management in connection with file inputs, it is far simpler to merely list a file path.

The manifest of certain example embodiments may be extensible to deal with novel input channels (e.g., registry keys on Windows, GUI interactions, etc.). For example, a JSON schema may be updated to reflect new or different possible input channels.

In certain example embodiments, the placement of hooks may be changed to deal with novel or difficult to process input channels. For instance, for encrypted input channels, it is unlikely that mutating encrypted inputs will lead to meaningful results, e.g., unless the encrypted inputs can be first decrypted, and then mutated prior to being re-encrypted. Thus, it may be desirable to hook in a different place, e.g., to capture inputs before they are encrypted and/or outputs after decryption. As a concrete example, it may be desirable to hook common libraries like OpenSSL after data has been decrypted, and redirecting can be suitably modified.

Although certain example embodiments have been described as working with blob fuzzers (or binary format fuzzers), the techniques described herein may be used in connection with different types of fuzzers. For example, certain example embodiments may work with "generational fuzzers" (or generative fuzzers) that operate based on some type of grammar specific for the SUT. In such cases, the grammar may be modified to make the approach work with such fuzzers.

In some instances, a tester may already have a test suite or at least the ability to run a SUT. That is, some SUTs may have a "built-in" or "ready-made" harness. The techniques of certain example embodiments may be useful in these instances, e.g., because the Bindle runtime can still be used to provide custom-generated blobs that the existing harness can use. That is, a harness may not care about the contents of the blob, as it may instead focus on providing the input to the SUT. The recording, blob generation, and fuzzing techniques of certain example embodiments thus may still be of benefit, in effect converting a SUT-specific harness to a generic harness that can receive custom-generated blobs. More particularly, a user with a test suite may have an ad-hoc harness that supports automated testing, even though it is not suitable for use with a dynamic analysis tool. In such cases, recording effectively converts the special-purpose harness of the test suite to a configuration of Bindle that can be used for fuzzing. Further, recording can convert the bespoke input encoding used in the test suite into blobs that can be used as seeds in fuzzing.

Similarly, the fuzzer may not care about the delimiters inserted into the blob. Instead, if the fuzzer tries to mutate a delimiter, it may result in a "malformed" input that triggers uninteresting behavior in the SUT, causing that input to quickly be discarded. Thus, the fuzzer does not need to change even though it is being used on a SUT with multiple input channels; rather, it can just start mutating.

Certain example embodiments may be integrated with common debuggers (such as, for example, gdb, WinDbug Preview, and/or the like). This integration may assist testers in evaluating the results of the fuzz testing.

As will be appreciated from the above, the techniques of certain example embodiments provide advantages compared to some current test approaches. For example:

Certain example embodiments alleviate the need to reverse engineer the SUT to some degree to understand inputs that the SUT is reading. Instead, certain example embodiments replace or supplement this approach with a record and auto-extract approach.

Certain example embodiments alleviate the need to write a custom harness that has to be able to handle all of the possible input channels, different ways of feeding input over those possible channels, etc. Such code itself may need to be debugged in order to interface with a fuzzer and SUT reliably. Instead, certain example embodiments replace this approach with a generic framework that operates in connection with a manifest and blobs that configure a runtime.

Certain example embodiments also facilitate the encoding of seeds. That is, certain example embodiments make it easier to avoid reverse engineering and gather inputs representative of typical runs and encode them for ways that are useful for fuzzer and SUT. In some instances, as noted above, a test suite may be provided, and test suites often have their own test harnesses that are not fuzzing harnesses. In such cases, certain example embodiments can record what happens when the test suite is run to in essence convert the test harness into a fuzzing harness with extracted seed values. In both cases, users simply run the application and do not worry about what is going on in the background, as the relevant capturing and converting tasks are transparent to the user.

It will be appreciated that certain example embodiments may run in connection with a standalone or networked computer and/or computer system comprising a plurality of computer nodes. In an example runtime environment, for example, one or more applications for capturing or otherwise recording inputs to the SUT, processing such recordings, curating a manifest, encoding blobs, fuzzing the SUT, configuring and/or attaching the harness, and performing the fuzzing of the SUT according to certain example embodiments may run in memory. Components may include, for example, memory, at least one processor, a data store, an OS kernel, etc. It will be appreciated that such an environment may be used in connection with, or be simply backed by an embodiment as shown in FIGS. 3-4.

It also will be appreciated that certain example embodiments may work in any runtime environment including, for example, Windows, Linux, Unix, MacOS, and/or other operating systems present on the example electronic devices mentioned above. In a similar vein, the techniques described herein may be used in any suitable combination, sub-combination, or combination of sub-combinations, e.g., as appropriate for the SUT, runtime environment, etc.

It will be appreciated that as used herein, the terms system, subsystem, service, component, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor (e.g., central processing unit (CPU) or specialized processor) execute instructions that may be tangibly stored on a computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of testing a system under test (SUT), the method comprising:
   recording interactions with the SUT;
   extracting inputs from the recorded interactions;
   generating a manifest from the extracted inputs, the manifest including (a) a list of inputs to the SUT to be replaced in connection with fuzzing of the SUT, and (b) input channels for entries in the list of inputs to the SUT, wherein the manifest is generatable to indicate whether the respective entries in the list of inputs to the SUT are fixed or non-fixed and blocking or non-blocking;
   encoding the extracted inputs into one or more archives, the encoding including inserting delimiters into the one or more archives based on the generated manifest, the extracted inputs being encoded in the one or more archives in an order specified by the manifest; and
   fuzzing the SUT using a generic harness configured for the SUT based on the generated manifest, the fuzzing of the SUT mutating the one or more archives to feed derived inputs to the SUT over the input channels specified in the generated manifest in connection with the testing.

2. The method of claim 1, wherein the interactions are user interactions performed during user execution of the SUT.

3. The method of claim 1, wherein the interactions are replays of a script.

4. The method of claim 1, interactions are recorded across multiple runs of the SUT.

5. The method of claim 4, wherein the manifest is generated from a filtered set of the interactions recorded across the multiple runs of the SUT.

6. The method of claim 1, further comprising identifying processes relevant to testing of the SUT from the recorded interactions.

7. The method of claim 1, further comprising identifying inputs to the SUT to be replaced using a heuristic.

8. The method of claim 1, wherein a plurality of archives are encoded, the archives being structured as blobs.

9. The method of claim 8, wherein the blobs are broken down into reference files, and the fuzzing comprises redirecting the SUT to the reference files based on the manifest.

10. The method of claim 8, wherein the fuzzing comprises demultiplexing contents of the blobs based on the manifest and feeding the demultiplexed contents to the SUT over input channels specified in the manifest.

11. The method of claim 1, wherein valid input channels specifiable in the manifest include files, network connections, command-line arguments, and environment variables.

12. The method of claim 1, wherein the manifest is provided in a structured file format.

13. The method of claim 1, wherein the order provides non-fixed socket inputs, then non-fixed file inputs, and then bytes used to select multiple choice inputs.

14. The method of claim 1, wherein different types of delimiters are encoded, a first delimiter type separating input components, a second delimiter type separating connections in the input for a given input channel, and a third delimiter type separating chunks in a non-blocking input.

15. A method of testing a system under test (SUT), the method comprising:
   recording interactions with the SUT;
   extracting inputs from the recorded interactions;
   generating a manifest from the extracted inputs, the manifest including (a) a list of inputs to the SUT to be replaced in connection with fuzzing of the SUT, and (b) input channels for entries in the list of inputs to the SUT, wherein the manifest is generatable to indicate whether the respective entries in the list of inputs to the SUT are fixed or non-fixed and blocking or non-blocking;
   encoding the extracted inputs into one or more archives, the encoding including inserting delimiters into the one or more archives based on the generated manifest, wherein different types of delimiters are encoded, a first delimiter type separating input components, a second delimiter type separating connections in the input for a given input channel, and a third delimiter type separating chunks in a non-blocking input; and
   fuzzing the SUT using a harness, the fuzzing of the SUT mutating the one or more archives to feed derived inputs to the SUT over the input channels specified in the generated manifest in connection with the testing.

16. The method of claim 15, wherein the harness is a pre-provided test harness for the SUT.

17. The method of claim 15, wherein the harness is a runtime configured by the manifest and usable with a plurality of different SUTs based on different provided manifests.

18. A non-transitory computer readable storage medium including instructions that, when executed by a hardware processor of a test framework, are configured to perform operations corresponding to the method of claim 15.

19. A test framework for testing a system under test (SUT), the framework comprising:

a recorder configured to record interactions with the SUT; and at least one processor operably coupled to a memory, the at least one processor being configured to perform operations comprising:

extracting inputs from the recorded interactions;

generating a manifest from the extracted inputs, the manifest including (a) a list of inputs to the SUT to be replaced in connection with fuzzing of the SUT, and (b) input channels for entries in the list of inputs to the SUT, wherein the manifest is generatable to indicate whether the respective entries in the list of inputs to the SUT are fixed or non-fixed and blocking or non-blocking;

encoding the extracted inputs into one or more archives, the encoding including inserting delimiters into the one or more archives based on the generated manifest, wherein different types of delimiters are encoded, a first delimiter type separating input components, a second delimiter type separating connections in the input for a given input channel, and a third delimiter type separating chunks in a non-blocking input; and fuzzing the SUT using a harness, the fuzzing of the SUT mutating the one or more archives to feed derived inputs to the SUT over the input channels specified in the generated manifest in connection with the testing.

20. The test framework of claim 19, wherein the extracted inputs are encoded in the one or more archives in an order specified by the manifest.

21. The test framework of claim 20, wherein the order provides non-fixed socket inputs, then non-fixed file inputs, and then bytes used to select multiple choice inputs.

22. The test framework of claim 19, wherein the manifest is generated from a filtered set of the interactions recorded across multiple runs of the SUT.

23. The test framework of claim 19, wherein a plurality of archives are encoded, the archives being structured as blobs.

24. The test framework of claim 23, wherein the fuzzing comprises demultiplexing contents of the blobs based on the manifest and feeding the demultiplexed contents to the SUT over input channels specified in the manifest.

25. The test framework of claim 19, wherein valid input channels specifiable in the manifest include files, network connections, command-line arguments, and environment variables.

* * * * *